United States Patent
Risso et al.

(10) Patent No.: US 10,291,613 B1
(45) Date of Patent: May 14, 2019

(54) MOBILE DEVICE AUTHENTICATION

(71) Applicant: Syniverse Technologies, LLC, Tampa, FL (US)

(72) Inventors: Denison Risso, Lutz, FL (US); Sreenivasa Ganji, Tampa, FL (US); Paul Peregolise, Valrico, FL (US); Rakesh Mehta, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/013,529

(22) Filed: Jun. 20, 2018

Related U.S. Application Data

(60) Provisional application No. 62/524,095, filed on Jun. 23, 2017.

(51) Int. Cl.
| | | |
|---|---|---|
| *H04W 12/06* | (2009.01) | |
| *H04W 4/00* | (2018.01) | |
| *H04L 29/06* | (2006.01) | |

(52) U.S. Cl.
CPC ........ *H04L 63/0876* (2013.01); *H04L 63/083* (2013.01)

(58) Field of Classification Search
None
See application file for complete search history.

(56) References Cited

U.S. PATENT DOCUMENTS

| | | | |
|---|---|---|---|
| 9,384,479 B2 | 7/2016 | Larkin | |
| 2011/0269472 A1* | 11/2011 | Xu | H04W 40/02 455/445 |
| 2017/0012898 A1* | 1/2017 | Zhu | H04L 12/6418 |
| 2017/0208463 A1* | 7/2017 | Brand | H04L 9/3271 |

* cited by examiner

*Primary Examiner* — Alexander Lagor
(74) *Attorney, Agent, or Firm* — Anton J. Hopen; Smith & Hopen, P.A.

(57) ABSTRACT

Authentication of a mobile device by its subscription is automatically performed by extracting the IMSI value from the mobile device's operating system via a locally installed mobile app. The IMSI value is passed onto an authentication system that has the necessary authentication and authorization infrastructure to query a mobile operator's database for a MSISDN associated with the IMSI value. If a valid MSISDN is found, the MSISDN is returned from the mobile operator to the authentication system and finally to the mobile app on the mobile device.

5 Claims, 4 Drawing Sheets

*Prior Art*

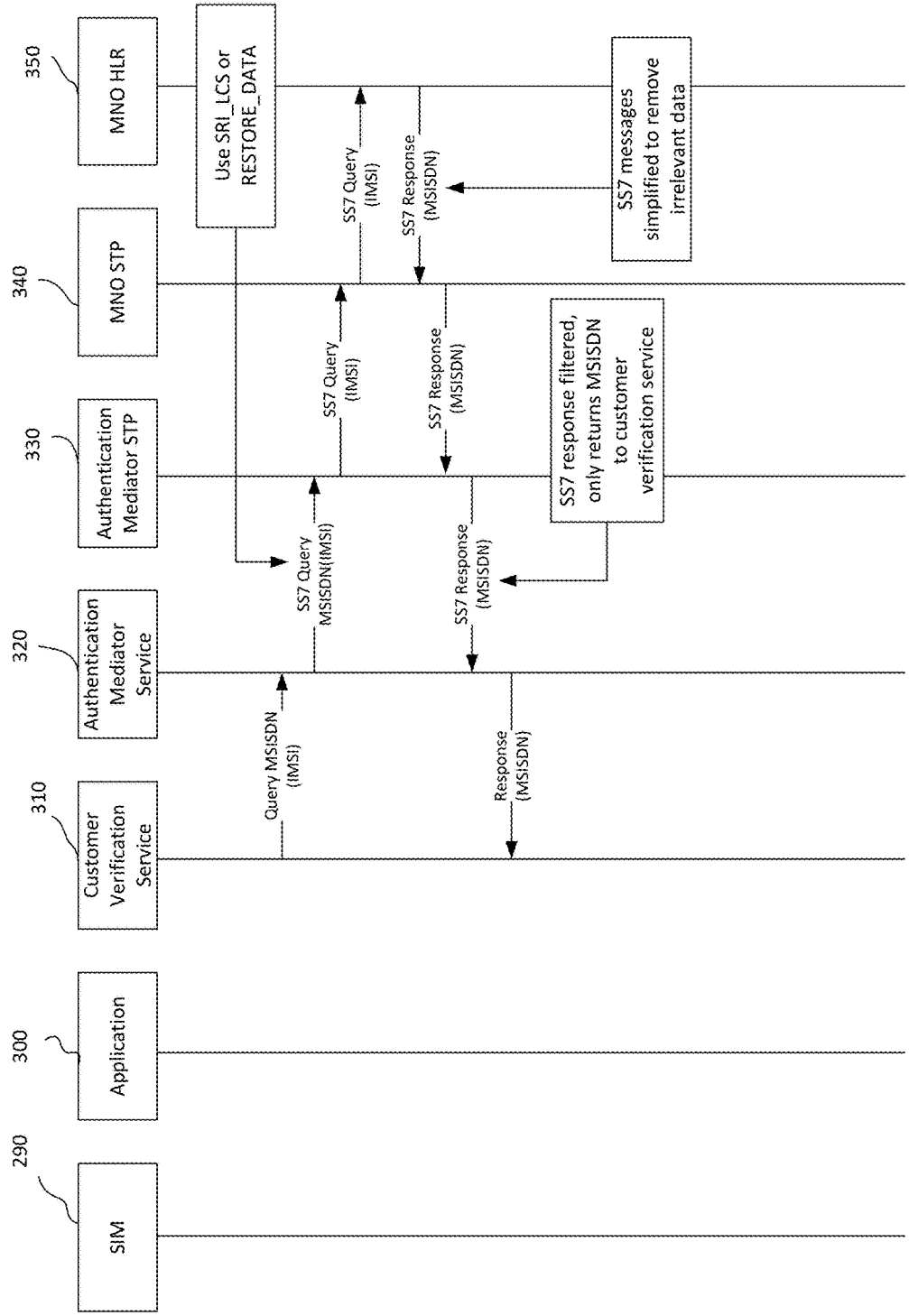

MOBILE DEVICE AUTHENTICATION

CROSS REFERENCE TO RELATED APPLICATIONS

This nonprovisional application claims priority to U.S. Provisional Patent Application No. 62/524,095, entitled "Mobile Device Authentication," filed Jun. 23, 2017, the entirety of which is incorporated herein by reference.

BACKGROUND OF THE INVENTION

1. Field of the Invention

This invention relates to mobile device security. More specifically, it relates to verifying the identity of a mobile device through automated communication with the mobile operator to which the mobile device subscribes.

2. Brief Description of the Related Art

Mobile device security in a critical factor in building reliable, trustworthy platforms for the exchange of data. A common authentication method for verifying the identity of a mobile device is to have an external verification process wherein an SMS message is returned to an end-user's mobile device with a security code the user manually keys in on the device. This is considered typical two-factor authentication which includes something the end user "knows" such as a password and something the end user "has" such as a uniquely identifiable object (e.g., mobile phone, finger print, retina image, card reader, etc.).

One drawback of this system is the time-sensitive requirement of user interaction with the device to verify the security. The request must be made for the SMS while the end user waits for a response. When the response does come in, the user must memorize or copy/paste the returned security code into a form on the mobile device to complete the authentication process.

It is theoretically possible for this system to be circumvented. For example, a user could receive the SMS code on a first mobile device and use the code to authenticate the mobile application on a second mobile device. In doing so, the integrity of the authentication process is thwarted.

What is needed in the art is an automatic method of authenticating the identity of a mobile device with little-to-no end user interaction. There is a further need in the art to authenticate the identity of a mobile device in a manner that enhances the integrity of the verification process.

However, in view of the art considered as a whole at the time the present invention was made, it was not obvious to those of ordinary skill in the field of this invention how the shortcomings of the prior art could be overcome.

BRIEF SUMMARY OF THE INVENTION

An embodiment of the invention includes a method of authenticating a mobile device with minimal to no end-user input on the device itself. The authentication flow is substantially automatic to the end-user and initiated by a mobile device application. The mobile device application might be a financial application or app store application that prefers to establish multi-factor authentication including verifying the identity of the mobile device. An IMSI value is retrieved from a backend gateway to a remote, trusted authentication mediator via a RESTful API. The IMSI value was originally obtained from a mobile software application installed locally on a mobile device. The mobile software application on the device employs an API that accesses the mobile device's operating system to obtain the IMSI value from a SIM card or integrated circuitry. The IMSI then transmitted from the mobile software application to the remote, trusted backend gateway which may be maintained by the developer of the mobile software application. The backend gateway and the trusted authentication mediator are communicatively coupled via the RESTful API.

The authentication mediator is an entity that includes the necessary network infrastructure and authorization to make MAP, SS7 or Diameter queries to mobile network operators, and specifically the HPMN for the mobile device. The authentication mediator parses the IMSI string (typically 15 digits) for the operator allocation number. This permits the authentication mediator to make a connection with the proper mobile network operator for that IMSI by resolving the mobile operator identity associated with the IMSI from the mobile operator allocation number. This step also permits the authentication mediator to decide what method to use to integrate with the operator (SS7, Diameter or API). For the current example, an SS7 method will be used although Diameter or API methods could also be implemented according to the current invention. The next step includes sending from a first STP at the authentication mediator a MAP request from the authentication mediator, the MAP request over SS7 is sent to a second STP at the mobile operator associated with the allocation number. The MAP request is one that will retrieve the MSISDN from the mobile network operator. Accordingly, the MAP request may include such queries as RESTORE_DATA, SRI-LCS, SAI, ANY_TIME_INTERROGATION and ANY TIME_SUBSCRIPTION_INTERROGATION.

The authentication mediator then receives from the MAP request to the mobile operator's HLR a returned record from the second STP to the first STP. The returned record includes a plurality of field values associated with a subscriber associated with the IMSI value. Because many of the fields are either irrelevant and/or sensitive, they are filtered out from the returned record leaving at least the MSISDN value.

The MSISDN value is then transmitted back to the backend gateway whereby it is returned to the application on the mobile device so that the MSISDN and subscription for mobile device are validated.

BRIEF DESCRIPTION OF THE DRAWINGS

For a fuller understanding of the invention, reference should be made to the following detailed description, taken in connection with the accompanying drawings, in which:

FIG. 4 is a diagrammatic view of an embodiment of the invention for resolving MSISDN using network queries over SS7.

DETAILED DESCRIPTION OF THE PREFERRED EMBODIMENT

Figure 1:
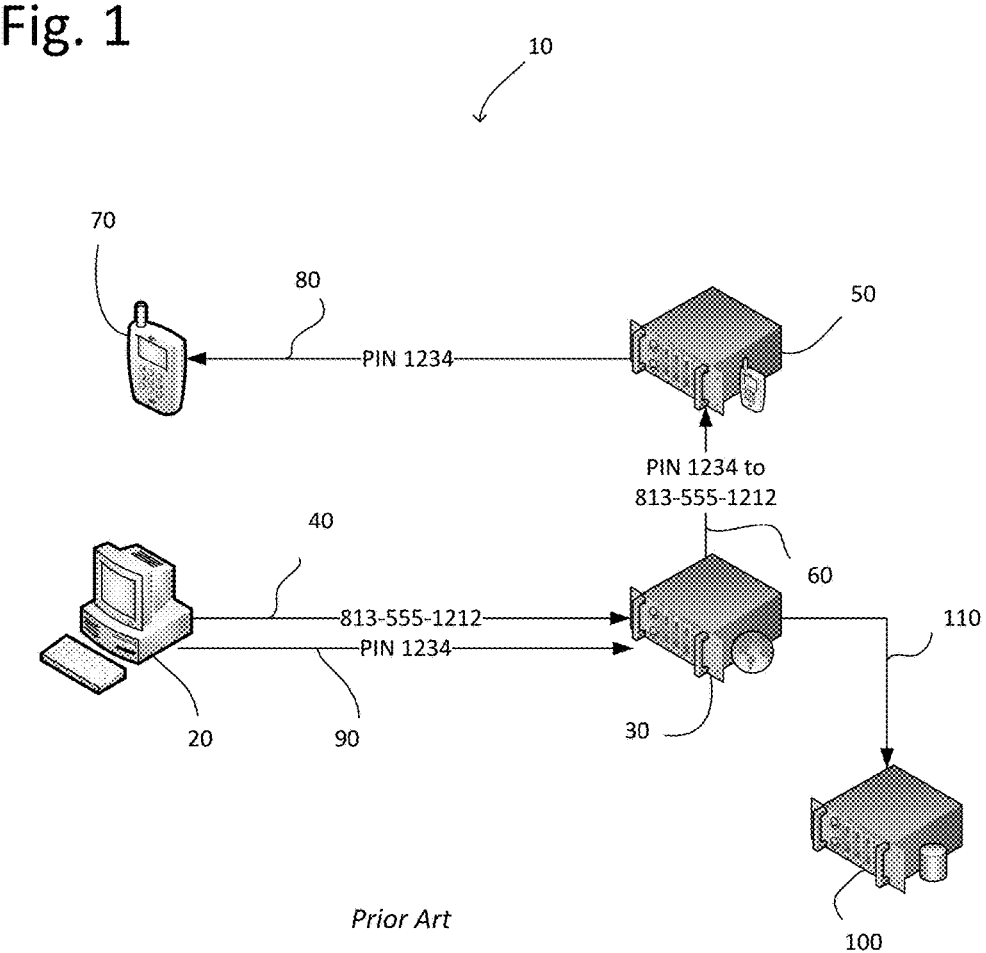
FIG. 1 is a diagrammatic view of a prior art mobile device authentication system.

In FIG. 1, a current state-of-the-art authentication system is shown. End user operates computer 20 which is communicatively coupled to web server 30. End user transmits to web server 30 a mobile phone number to authenticate. Web server randomly generates a PIN comprising an integer and sends to mobile application server 50 with the proposed mobile number. Mobile application server 50 sends an SMS text 80 to the mobile number with PIN integer which, if valid, is received by mobile device 70. End user views the SMS message received on mobile device 70 and then keys in the PIN integer through computer 20 which is transmitted 90 back to web server 30. If validated, web server updates 110 database server 100 that the mobile phone has been authenticated with an account for the end user. This is just one exemplary work flow. Mobile devices and mobile applications may permit the mobile phone 70 to both request and receive the PIN. However, the end user would have to key in the mobile number for validation and the SMS is received by the messaging application on the phone. The end user could intentionally or inadvertently key in the wrong mobile phone number or mistype the wrong PIN received by the SMS message. The system as exemplified in FIG. 1 requires user interaction which may create friction in getting users to authenticate their mobile devices for security, finance and/or electronic commerce.

An embodiment of the present invention is a mobile device application or mobile app which runs locally on a mobile device such as a smartphone. The mobile device is subscribed to a wireless carrier such as those serviced under the brands of AT&T MOBILITY, VERIZON WIRELESS, T-MOBILE, VODAPHONE, ORANGE and TELEFONICA. Various operating systems run on such mobile devices such as those branded TIZEN, iOS, ANDROID and WINDOWS 10 MOBILE. The application makes a call to the operating system of the device for the IMSI. The IMSI string is retrieved and passed on to the wireless carrier to return the MSISDN for the IMSI. If the query for the MSISDN from the IMSI generates an exception or result code indicating the IMSI is not valid then the result may also be passed back to the application as an authentication failure.

For a mobile device operating under the ANDROID brand operating system, the IMSI string of integers may be retrieved by a local application installed on the device itself. For authentication calls in the ANDROID environment, the response is only accessible when the ANDROID API level is greater than 24 and the READ_PRIVILEGED_PHONE_STATE is granted for the app. The carrier privilege is granted by signing the app with the correct certificates stored on the universal integrated circuit card (UICC). Using JAVA programming syntax, the ISMSI could be retrieved by:

String myIMSI=android.os.SystemProperties.get(android.telephony.TelephonyProperties.PROPERTY_IMSI);

An alternative written in a JAVA Activity class:
TelephonyManager mTelephonyMgr=(TelephonyManager) getSystemService(Context.TELEPHONY_SERVICE);
String imsi=mTelephonyMgr.getSubscriberId( );

Permissions should be properly set in the AndroidManifest.xml file:
    <uses-permission android:name="android.permission.READ_PHONE_STATE"/>

For devices running under the WINDOWS MOBILE operating system, the IMSI may be retrieved using the SubscriberId value from the Mobile BroadbandDeviceInformation class. The MobileBroadbandDevice Information class functionality is typically only enabled for mobile network operators. For example, in C#:
    public string SubscriberId {get;}

For devices that support the GSM cellular class, the SubscriberId value represents the IMSI, which is up to 15 digits long. For devices that support the CDMA cellular class, the SubscriberId value represents the Mobile Identification Number (MIN) string, or the International Roaming MIN (IRM), which is 10 digits long.

Figure 2:
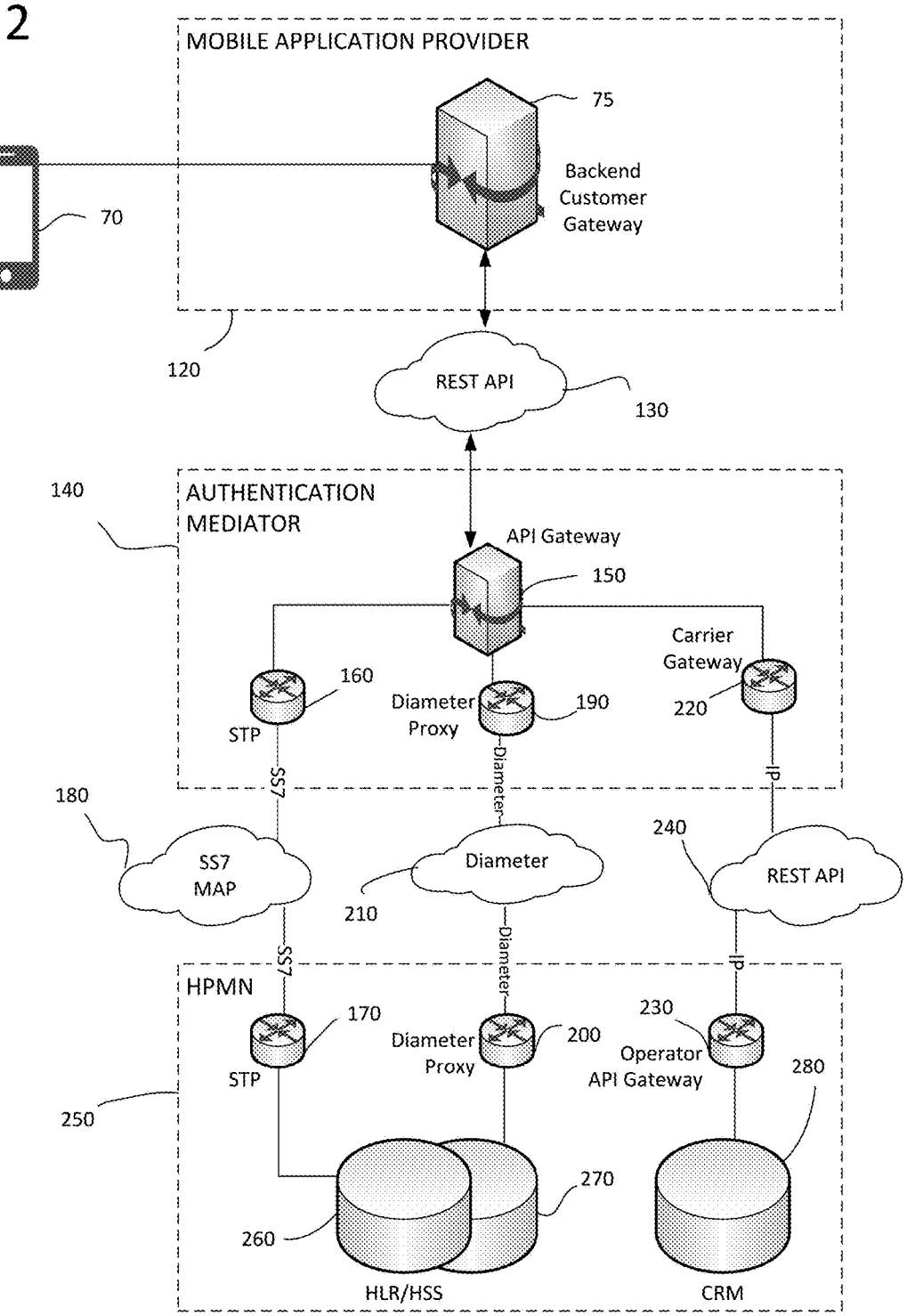
FIG. 2 is a diagrammatic view of an embodiment of the invention showing connectivity between a mobile device and the associated mobile network operator infrastructure.

Turning to FIG. 2, mobile device 70 contains a locally installed software application that is communicatively coupled to mobile application provider 120 via a backend customer gateway 75. A REST API 130 connects customer gateway 75 to API gateway 150 managed by authentication mediator 140. Depending on the infrastructure of the HPMN 250, the API gateway 150 may connect to HPMN 250 via SS7 MAP 180, diameter 210 and/or REST API 240. In the SS7 MAP 180 connection, a first STP 160 connections via SS7 MAP 180 to second STP 170 which then connects to the HLR/HSS 260 of HPMN 250. In another embodiment, first diameter proxy 190 at authentication mediator 140 connects via diameter protocol 210 to second diameter proxy 200 at HPMN 250. Second diameter proxy 200 then connects to HLR/HSS 260. Finally, in a third embodiment, authentication mediator 140 uses carrier gateway 220 to connect its API gateway 150 to CRM 280. Carrier gateway 220 connects to operator API gateway 230 via IP protocol using REST API 240.

Figure 3:
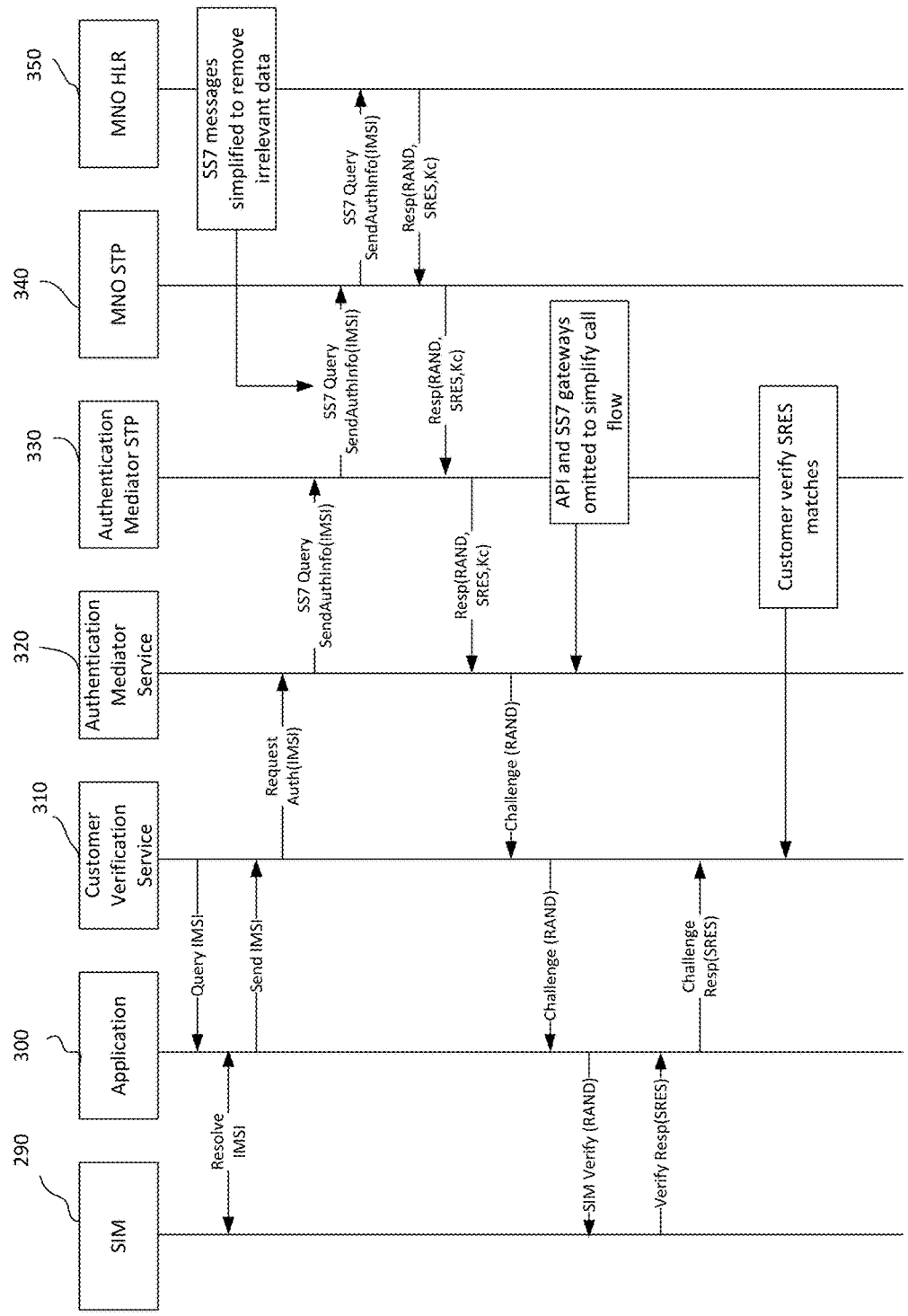
FIG. 3 is a diagrammatic view of an embodiment of the invention for SIM verification.

FIG. 3 illustrates an embodiment of the invention using SS7 and extended SIM verification. For the purposes of this embodiment, SIM may be a physically removable integrated circuit card or a non-removable integrated circuit on the mobile device itself. Customer verification service 310 makes a query for an IMSI on a device. Application 300 residing on the mobile device sends an API call for the IMSI from SIM 290. The IMSI is then received by application 300 and passed back to customer verification service 310. Customer verification service 310 then sends a request to authentication mediator service 320 for authorization for the IMSI retrieved from the SIM. Authentication mediator service 320 issues a SS7 query, SendAuthInfo(IMSI), from its signal transfer point 330 to the signal transfer point 340 of the mobile network operator. The mobile network HLR 350 is queried and responds to the SS7 Query SendAuthInfo (IMSI) request with a triplet comprised of (1) a random number challenge (RAND); (2) a secret response (SRES) generated using the IMSI, random number and Ki; and (3) a session key, Kc. Authentication Mediator Service 320 forward on the challenge (RAND) to customer verification service 310 then passes on the challenge RAND to application 300, and, in turn, to SIM 290. Responsive to RAND, SIM 290 returns SRES to application 300 and back to customer verification service 310, which will perform a call to the authentication mediator service 320 containing the IMSI, the random number challenge (RAND) and the secret response (SRES). If the SRES generated from SIM 290 matches the SRES generated from MNO HSS 350 then the IMSI is successfully authenticated and the authentication mediator service 320 will respond to the customer verification service 310 with a successful response.

Another alternative embodiment of the invention is shown in FIG. 4 wherein the MSISDN is resolved using network queries. Customer verification service 310 queries a MSISDN from authentication mediator service 320 which then issues a SS7 query from its STP 330 to the MNO STP 340. The SS7 query uses MAP commands SRI_LCS or RESTORE_DATA against the MNO HLR 350 which generates an SS7 response. The SS7 response includes additional data not required for verification of the MSISDN so authentication mediator service 320 filters out data (particularly, security-sensitive data) and returns a response including the MSISDN to customer verification service 310.

Extracting the IMSI value from the device's operating system offers a high-degree of authentication. It is not required for the end user to see the IMSI value or even know that it has been obtained from the device SIM or integrated circuitry. The IMSI value is then transmitted from the mobile device to return its associated MSISDN value from the mobile network operator to which the mobile device subscribes. There are several pathways to achieving this depending on the network topology and business model of the authentication service.

A first pathway sends the IMSI value to the entity that authors, manages and/or distributes to the local software application that extracted the IMSI value from the mobile device's operating system. By way of example, ANDROID brand devices typically are pre-installed with app marketplace software. An update to the marketplace software application on the device includes the call to extract the IMSI value from the ANDROID operating system. The marketplace software then sends the IMSI value to a backend gateway. From the backend gateway, through a RESTful API, web service or other data exchange, the IMSI value is passed on to an authentication mediator. This may be a system internal to the marketplace software provider or a separate entity with the necessary hardware, software and trust relationships with mobile network operators to send MAP requests to the HLR or HSS databases of the mobile network operators. The MAP request either returns a valid MSISDN associated with the IMSI or an exception indicating a problem with the IMSI value. The data flows essentially in reverse at this point wherein the mobile network operator returns the IMSI value to the authentication mediator. However, the MAP request might return additional, sensitive fields that are not necessary to share with the local application on the mobile device. The authentication mediator filters out fields to both increase security and reduce the size of the data payload. The authentication mediator returns the MSISDN to the backend gateway which then sends the MSISDN to the local application on the mobile device.

An advantage of this invention is that the authentication of the mobile device takes place in the background with respect to the user. In the case of establishing a purchasing profile or conducting a financial transaction, it is important to remove tedious end user tasks. Unlike other technologies, there is no initial registration of MSISDNs and corresponding IMSIs. It is unnecessary for the end user to key in a code transmitted by SMS into the mobile device. The end user experience is improved by reducing engagement with the user interface for tasks that can otherwise be automated by the present invention.

Hardware and Software Infrastructure Examples

The present invention may be embodied on various computing platforms including, but not limited to, portable touchscreen devices, IoT components and M2M applications that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claim Terms

A3 Algorithm computes a 32-bit signed response (SRES). The Ki and RAND are inputted into the A3 algorithm and the result is the 32-bit SRES. The A3 algorithm is present on the SIM card and the AuC.

Allocation number is the mobile network code (MNC) within an IMSI string of integers. The MNC is either 2 digits for the European standard or 3 digits for the North American standard. The 2-3 digit MNC follows the first 3 digits in the IMSI which is the mobile country code (MCC). The remaining digits after the MNC are the mobile subscription identification number (MSIN) which 10 or 9 digits depending on the MNC length.

Any Time Interrogation is a request made to the HLR of a mobile operator to return subscriber data including the MSISDN.

Any Time Subscription Interrogation is a request made to the HLR of a mobile operator to return subscriber data including the MSISDN.

API stands for Application Programming Interface. An API is software that another application program employs to request and carry out lower level functions performed by an operating system or a software application. An API provides a uniform way to access functions, methods and procedures in another software system (either remote or local) by abstracting the underlying implementation and only exposing objects or actions the developer needs.

Authentication mediator means a software application service communicatively coupled between the mobile device to be authenticated and the mobile operator to which the mobile device subscribes.

Diameter is a computer network protocol.

HLR means Home Location Register which is a database that contains subscription data about subscribers in a mobile network.

HSS means Home Subscriber Service which implements HLR and Diameter signaling. The HSS is used in IMS and 4G while HLR is used in 2G and 3G.

HPMN means Home Public Mobile Network. The HPMN is the network from the operator by which a mobile subscriber has a subscription. The term is used in contrast to visited public mobile network (VPMN) which relates to roaming.

IMS means IP Multimedia Subsystem, an architectural framework to standardize the delivery of voice and other multimedia services of IP packet-switched networks.

IMSI means International Mobile Subscriber Identity. It is a specification used to uniquely identify a subscriber to a mobile telephone service. It is used internally to a GSM network and is adopted on nearly all cellular networks. The IMSI is a 50-bit field which identifies the phone's home country and carrier and is usually fifteen digits. This 15-digit number has two parts. The first part is comprised of six digits in the North American standard and five digits in the European standard. It identifies the GSM network operator in a specific country where the subscriber holds an account. The second part is allocated by the network operator to uniquely identify the subscriber. For GSM, UMTS and LTE network, this number is provisioned in the SIM card and for CDMA2000 in the phone directly or in the R-UIM card (the CDMA2000 analogue to a SIM card for GSM).

Kc is a 64-bit ciphering key used as a session key for encryption in SS7 communications. Kc is generated by the mobile network operator from a random challenged presented by the GSM network and the Ki from the SIM utilizing the A8 algorithm.

Ki is a 128-bit individual subscriber authentication key used as a private key shared between a mobile station and the HLR/HSS of the subscriber's home network. Ki is never transmitted over the radio channel, as it is present in the subscriber's SIM, as well as the AUC, HLR, and VLR databases. The Ki is paired with an IMSI when the SIM card is created. Without knowledge of Ki (which is never transmitted over the air) one cannot form Kc. Ki is only stored in two places, the authentication center within the network and the SIM.

LCS stands for Location Services used to exchange messages between a handset and an SMLC (serving mobile location center) in order to provide geolocation information.

Mobile application part (MAP) is an SS7 protocol used to access the home location register (HLR), visitor location register (VLR), mobile switching center and other components of a mobile network infrastructure.

Mobile device is a portable computing device connected to a wireless network such as a cellular phone, smart phone, or tablet device.

Mobile Operator (or MNO) means a wireless service provider, cellular company, wireless carrier, or mobile network carrier. An MNO is a provider of wireless communication services. The MNO owns or controls substantially all the elements necessary to sell and deploy services to customer subscribers including radio spectrum allocation, wireless network infrastructure, back haul infrastructure, customer care, billing, provisioning computer systems, marketing and repair departments.

MSISDN means Mobile Station International Subscriber Directory Number which is provisioned to a mobile device subscriber for making calls. It is the mapping of the telephone number to the SIM card (or CDMA2000 directly in the hardware) in a mobile or cellular phone and is the number normally dialed to connect a call to the mobile device. A SIM card has a unique IMSI that does not change but the MSIDN can change in time (e.g., telephone number portability).

Parse means to search, separate or extract a subset of data from a first value to arrive at a second value. This may include fix-field extraction based on alphanumeric character position, searching for character strings or delimitators, or other form of syntax analysis.

RAND is a 128-bit random challenge generated by the HLR/HSS.

REST or RESTful web services provide interoperability between computer systems on the Internet. REST stands for Representational State Transfer. A RESTful web service will make requests to a resource's URI that will respond in XML, HTML, JSON or other defined format. HTTP is the most common protocol for REST operations and use the HTTP verbs GET, POST, PUT, DELETE and the like.

Restore data request prompts an HLR/HSS to resend the details for an individual mobile subscriber which includes the MSISDN. The request is made by use of the mobile application part (MAP) of the SS7 protocol and transported using traditional TDM-based signaling or over IP using SIGTRAN.

SAI (send authentication info) request is a request to a mobile operator's database that returns customer information and the MSISDN value for the customer subscriber record.

SIM (subscriber identity module) is an integrated circuit that stores the IMSI number, its related key and additional data.

SRES is a 32-bit signed response generated by a mobile station and the mobile services switching center.

SRI_LCS request is a message request to a mobile operator's database that returns a response including the VLR point code of the customer and the MSISDN value. The request is made by use of the Mobile Application Part (MAP) of the SS7 protocol and transported using traditional TDM-based signaling or over IP using SIGTRAN.

SS7 means Signaling System 7 which typically employs a dedicated 64 kilobit data circuit to carry packetized messages about each call connected between machines of a network to achieve connection control.

Signal Transfer Point (STP) is a router that relays SS7 messages.

Triplet refers to RAND, SRES and Kc values (crypovariables) collectively used for authentication by a mobile operator network.

VLR means Visitor Location Register. VLR is a database storing data about mobile phones that recently joined a particular area of a mobile operator's network. The VLR keeps track of roamed mobile phone subscribers and communications with the HLR to determine whether the mobile phone is a permanent or temporary subscriber.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of authenticating a local application installed on a mobile device registered with a mobile operator having a mobile operator subscription state for the mobile device, the method comprising the steps of:
   receiving by an authentication mediator an IMSI value from the local software application which retrieved the IMSI from an API call to an operating system on the mobile device,
   requesting over a network connection from the authentication mediator to the mobile operator a MSISDN value associated with the IMSI value;
   receiving from the mobile operator the MSISDN value associated with the IMSI value; and
   forwarding the MSISDN value back to the local application on the mobile device whereby the mobile operator subscription for mobile device is verified and the local application is authenticated whereby the subscription state for the mobile device is unchanged.

2. The method of claim 1 wherein the network connection from the authentication mediator to the mobile operator is established on a SS7 protocol.

3. The method of claim 1 wherein the network connection from the authentication mediator to the mobile operator is established on a diameter protocol.

4. The method of claim 1 wherein the network connection from the authentication mediator to the mobile operator is established on a RESTful protocol.

5. A method of authenticating a mobile device comprising the steps of:
   receiving an IMSI value from a backend gateway to a remote, trusted authentication mediator via a RESTful API, the IMSI value obtained from a mobile software application installed locally on a mobile device, the mobile device having a subscription state with a mobile operator network, the IMSI value for the mobile device obtained through an API accessing the mobile device operating system, the IMSI then transmitted from the mobile software application to the remote, trusted backend gateway, parsing a mobile operator allocation number from the IMSI value;
   resolving an HPMN identity associated with the IMSI from the mobile operator allocation number;
   sending from a first STP at the authentication mediator a MAP request from the authentication mediator, the MAP request selected from the group consisting of RESTORE_DATA, SRI-LCS, SAI, any time interrogation and any time subscription interrogation over SS7 to a second STP at the HPMN associated with the allocation number;
   receiving from the MAP request to the HPMN's HLR or HSS a returned record from the second STP to the first STP, the returned record having a plurality of field values associated with a subscriber associated with the IMSI value;
   filtering from the returned record, the MSISDN value; and
   forwarding the MSISDN value back to the backend gateway whereby it is returned to and authenticates the application on the mobile device so that the MSISDN and subscription for mobile device are validated wherein the subscription state for the mobile device is unchanged.

* * * * *